United States Patent [19]

Kerman

[11] Patent Number: 5,389,316
[45] Date of Patent: Feb. 14, 1995

[54] PROCESS FOR PRODUCING AN ENERGY ABSORBING PANEL

[75] Inventor: Michael L. Kerman, Romeo, Mich.

[73] Assignee: Woodbridge Foam Corporation, Ontario, Canada

[21] Appl. No.: 862,172

[22] Filed: Apr. 2, 1992

Related U.S. Application Data

[63] Continuation-in-part of Ser. No. 744,331, Aug. 13, 1991, abandoned.

[51] Int. Cl.$^6$ ............................................. B29C 65/00
[52] U.S. Cl. ................................. 264/46.5; 264/46.4; 264/257; 264/258; 264/279.1; 428/246; 428/226
[58] Field of Search ................. 264/46.5, 46.6, 46.4, 264/257, 258, 279.1; 428/246, 286

[56] References Cited

U.S. PATENT DOCUMENTS

| | | | |
|---|---|---|---|
| 3,186,969 | 6/1968 | Cox et al. | 268/51.5 |
| 3,245,924 | 4/1966 | Cox et al. | 260/2.5 |
| 3,493,257 | 2/1970 | Fitzgerald | 293/71 |
| 3,494,607 | 10/1970 | Rusch | 267/1 |
| 3,586,649 | 6/1971 | Cobbledick | 260/2.5 AZ |
| 3,839,138 | 10/1974 | Kyle et al. | 161/159 |
| 3,860,279 | 1/1975 | Hulten | 293/72 |
| 3,917,332 | 11/1975 | Puleo | 293/63 |
| 3,939,106 | 2/1976 | Dunleavy et al. | 260/2.5 AM |
| 4,101,704 | 7/1978 | Hiles | 428/218 |
| 4,107,106 | 8/1978 | Dunleavy et al. | 521/164 |
| 4,116,893 | 9/1978 | Flanagan | 521/137 |
| 4,130,614 | 12/1978 | Saidla | 264/46.4 |
| 4,134,610 | 1/1979 | Lindewall | 293/71 R |
| 4,190,712 | 2/1980 | Flanagan | 521/137 |
| 4,422,680 | 12/1983 | Goupy | 293/122 |
| 4,508,774 | 4/1985 | Grabhoefer et al. | 428/220 |
| 4,616,866 | 0/1986 | Loren et al. | 293/120 |
| 4,645,249 | 2/1987 | Nagoshi et al. | 293/102 |
| 4,657,937 | 4/1987 | Kuwabara et al. | 521/56 |
| 4,659,618 | 4/1987 | Yazaki et al. | 428/317.7 |
| 4,663,210 | 5/1987 | Schreiber et al. | 428/160 |
| 4,713,032 | 12/1987 | Frank | 441/74 |
| 4,766,025 | 8/1988 | Sanok et al. | 428/159 |
| 4,806,302 | 2/1989 | Frank | 264/46.7 |
| 4,866,102 | 9/1989 | Pray et al. | 521/137 |
| 4,952,447 | 8/1990 | Phillips et al. | 428/318.6 |

FOREIGN PATENT DOCUMENTS

| | | |
|---|---|---|
| 0448063A1 | 9/1991 | European Pat. Off. . |
| 0495188A1 | 7/1992 | European Pat. Off. . |
| 2545039 | 11/1984 | France . |
| 2029301 | 2/1971 | Germany . |
| 2434175A1 | 2/1975 | Germany . |
| 4-28511 | 2/1990 | Japan . |
| 1169446 | 11/1969 | United Kingdom . |
| WO80/01892 | 9/1980 | WIPO . |
| WO85/00755 | 2/1985 | WIPO . |
| WO89/02363 | 3/1989 | WIPO . |

Primary Examiner—George F. Lesmes
Assistant Examiner—Chris Raimund
Attorney, Agent, or Firm—Nixon & Vanderhye

[57] ABSTRACT

A process for producing an energy absorbing panel having at least one energy absorbing surface in a mold comprising an upper mold and a lower mold. The process comprising placing a reinforcing layer in both of the upper mold and the lower mold. A liquid foamable polyurethane composition is then dispensed in the lower mold and allowed to expand to fill from 50-80% of the mold volume. The upper mold and lower mold are then closed to define an enclosure corresponding substantially to the energy absorbing panel and the liquid foamable polyurethane composition is expanded to fill the remainder of the enclosure to produce a resilient polyurethane foam core which adheres to the reinforcing layers thereby providing an energy absorbing surface. The reinforcing layer has a tensile strength greater than the tensile strength of the resilient polyurethane foam core. Upon compression of the panel at the energy absorbing surface to about 50% by volume of the uncompressed panel in a direction substantially normal to the reinforcing layer, the panel recovers to at least about 90% of volume of the uncompressed panel in less than about 30 minutes. The panel has widespread utility and is particularly useful in vehicular applications.

7 Claims, No Drawings

PROCESS FOR PRODUCING AN ENERGY ABSORBING PANEL

This is continuation-in-part application of Ser. No. 07/744,331, filed Aug. 13, 1991, now abandoned.

BACKGROUND OF THE INVENTION

1. Field of the Invention

The present invention relates to a process for producing an energy absorbing panel.

2. Brief Description of the Prior Art

Energy absorbing devices (also known as energy management devices) are known. Such devices can take one of a variety of shapes and forms. Currently, one of the major applications for energy absorbing panels is in use in vehicles, particularly automobiles. Such panels, when used in vehicles, would be of great convenience if they could be included in or substituted for trim panel and, indeed, are commonly referred to as trim panels. Current trim panels are particularly deficient as regards their ability to combine durability with energy absorbing capability.

A common use for energy absorbing panels is in a vehicle instrument panel. An instrument panel typically includes a plastic substrate and a head impact zone. Pursuant to recent governmental guidelines for improved passenger safety, it is now a prerequisite that instrument panels and areas of the interior of the vehicle have an energy management capability.

Heretofore, known instrument panels have comprised the use of a rigid substrate over which is placed a resilient, decorative foam. The foam has an indentation force deflection characteristic of about 1 to 2 pounds per square inch at 25 percent compression of the foam. This amounts to little or no energy absorbing capability for the foam. To make up for this, the substrate must be rigid, typically with a flexural modulus of at least 8,000 MPa. The rigid substrate is usually provided at a thickness of about ⅛ of an inch and is configured to have specific defined impact zones. This is deficient since the areas which are not impact zones are insufficient to absorb the energy of an impact. Rather, in such areas, the energy of impact tends to deflect away from the rigid substrate. In the case of an instrument panel, this can lead to severe or fatal consequences for a passenger of vehicle.

The use of foam in an energy absorbing panel is known. Prior panels typically comprise the use of a friable, crushable foam (e.g. rigid polystyrene, rigid polyurethane and the like). In use, this type of foam absorbs the energy from a single impact and, concurrently, crushes. Accordingly, after a single impact, the foam must be replaced.

U.S. Pat. No. 4,508,774 discloses thermoforming compression of polyester-urethane foams. Specifically, this patent discloses cellular polyurethanes having a density of 15–400 kg/m$^3$ and based on aromatic polyisocyanates and polyester polyols. The thermoforming takes place in a forming tool at a compression factor of 1–10 and at a temperature of 140° to 200° C. This patent discloses the use of a starting polyurethane foam slab having a density of 15–40 kg/m$^3$ which is cut to suitable dimensions of the finished article. Thereafter, the cut slab is thermoformed using conventional techniques. The compression factor for closed molds is defined as the quotient of the density of the final polyurethane foam and the density of the initial polyurethane foam.

The process disclosed in U.S. Pat. No. 4,508,774 is deficient for a number of reasons. Generally, the process is complicated by having to use premanufactured foam. This results in extra steps associated with making and shaping the pre-manufactured foam resulting in wastage of trimmed foam. Further, the use of a pre-manufactured foam necessitates the use of a specialized mold to provide the appropriate compression factor and to withstand the conditions of rapid mold closure and specialized temperature control required in the thermoforming operation. Third, the use of a pre-manufactured foam necessitates the use of spray, laminating or hot-melt adhesives to adhere the reinforcing or decorative layer to the pre-formed foam while conducting the thermoforming operation. Fourth, when a fibrous reinforcing layer is used, the process of using an adhesive between the reinforcing layer and the polyurethane foam results in an inferior panel since the adhesive must serve the dual purpose of (i) adhering the reinforcing layer to the foam and (ii) forming a uniform matrix for inherent reinforcement of the fibrous reinforcing layer. Fifth, the requirement for a relatively high temperature during the thermoforming operation renders the overall process energy intensive.

In view of the above-mentioned deficiencies of the prior art, it would be desirable to have a relatively simple process for producing an energy absorbing panel which obviates or mitigates at one of the above-identified deficiencies of the prior art.

SUMMARY OF THE INVENTION

It is an object of the present invention to provide a novel process for producing an energy absorbing panel.

Accordingly, the present invention provides a process for producing an energy absorbing panel having at least one energy absorbing surface in a mold comprising an upper mold and a lower mold, the process comprising the steps of:

(i) placing a reinforcing layer in at least one of the upper mold and the lower mold;

(ii) dispensing a liquid foamable polyurethane composition in the lower mold;

(iii) closing the upper mold and the lower mold to define an enclosure corresponding to the shape of the energy absorbing panel; and (iv) expanding the foamable liquid polyurethane composition to fill substantially the enclosure to produce a resilient polyurethane foam core which adheres to the reinforcing layer thereby providing an energy absorbing surface;

wherein the reinforcing layer has a tensile strength greater than the tensile strength of the resilient polyurethane foam core and upon compression of the panel at the energy absorbing surface to about 50% by volume of the uncompressed panel in a direction substantially normal to the reinforcing layer, the panel recovers to at least about 90% of volume of the uncompressed panel in less than about 30 minutes.

DETAILED DESCRIPTION OF THE PREFERRED EMBODIMENTS

It will be appreciated by those skilled in the art that the order of the process steps may be varied depending on the exact nature of the process. For example, in certain cases, it may be possible to place the reinforcing layer in the lower mold (or in the upper mold if secured by suitable fastening means), close the upper mold and the lower mold and thereafter inject the liquid foamable polyurethane composition—this is called a "closed mold" pouring technique. Alternatively, the upper mold and lower mold are not closed until the liquid polymeric composition has expanded to about 50, preferably from about 50 to about 90, more preferably from about 60 to about 80, most preferably from about 70 to about 80, percent by volume of the enclosure defined by closing the upper mold and the lower mold—this is called an "open mold" pouring technique. To the applicants knowledge, the "open mold" and "closed mold" pouring techniques work equally well and the choice of technique used is usually dictated by the nature of the article being produced. Generally, it has been found that the "open mold" pouring technique is most convenient since the mold has to be opened in any event to place therein the reinforcing layer which is preferably flexible.

It has been surprisingly and unexpectedly discovered that the provision of the energy absorbing panel produced by the present process obviates the need for a rigid substrate in particular automotive applications such as passenger side air bag doors, knee bolsters, side impact bolsters, A, B and C pillars, sun visor cores and door panels. Many of these devices have heretofore had little or no energy management capability. The necessity of such capability has been recently mandated in the United States and other countries. It has also been discovered that the energy absorbing panel produced by the present process is capable of repeated impact since the core is comprised of a relatively resilient polyurethane foam core. These outstanding properties accrue from the energy absorbing panel produced by the present process due to its inherent relatively uniform energy absorbing capability when compared with known panels comprising high resiliency-low energy absorbing foams and low resiliency-high energy absorbing substrates. It is believed that the relatively uniform energy absorbing capability of the energy absorbing panel produced by the present process is due substantially to the interaction, upon impact, between the polyurethane foam core and the reinforcing layer.

The energy absorbing panel produced according to the present process includes at least one energy absorbing surface having a reinforcing layer adhered to and covering at least a portion of the resilient polyurethane foam core. Preferably, the polyurethane core is disposed between a first energy absorbing surface and a second energy absorbing surface in a spaced, substantially parallel relationship to one another. The provision of two energy absorbing surfaces can lead to a dramatic increase in energy absorbing capability when compared to the use of a single energy absorbing surface as will be described hereinafter.

The choice of reinforcing layer used in the present process is not particularly restricted provided that it has a greater tensile strength than the polyurethane foam core and may be a non-metal or a metal. Preferably, the reinforcing layer is flexible. The flexible reinforcing layer may be fibrous or nonfibrous. Non-limiting examples of fibrous reinforcing layers include at least one member selected from the group consisting essentially of glass fibres (e.g. in the form of a cloth or a mat, chopped or unchopped, such as Nico 754 1 oz/ft$^2$), polyester fibres, polyolefin fibres (e.g. polyethylene and polypropylene), Kevlar fibres, polyamides fibres (e.g. nylon), cellulose fibres (e.g. burlap), carbon fibres, cloth materials such spun bound polyesters (e.g. Lutravil 1DH7210B/LDVT222 and Freudenberg PTLD585G/PTLD600B) and paper (e.g. Kraft #60). It will be appreciated that the fibrous reinforcing layer may be woven or non-woven. Nonlimiting examples of a non-fibrous reinforcing layer comprise at least one member selected from the group consisting essentially of thermosets (e.g. polyurethanes, polyesters and epoxies), metals such as aluminum foil, polycarbonates (e.g. Lexan and Dow Calibre), polycarbonate/ABS alloys (e.g. Dow Pulse), ABS terpolymers (e.g. Royalite 59 and Dow Magnum), polyester terphthalate (PET), vinyl, styrene maleic anhydride (e.g. Arco Dylark), and fibreglass reinforced polypropylene (e.g. Azdel). It will be appreciated that many non-fibrous reinforcing layer materials may themselves be reinforced with fibrous materials and thus, the flexible reinforcing layer may be a combination of fibrous and non-fibrous materials, either mixed or composite in construction.

Preferably, the present process further comprises the step of utilizing a decorative layer to cover at least one surface of the energy absorbing surface. The specific choice of decorative layer is not particularly restricted and is usually dictated by application of the energy absorbing panel. A preferred decorative layer comprises a polyethylene or polyvinyl chloride (PVC) foam layer which is thermoformable, closed cell and permits one-step production of the entire decorative panel. In the case where a single flexible reinforcing layer is used, the decorative layer may be placed between the mold (upper or lower) and the flexible reinforcing layer or it may place in the other of the upper mold or lower which is not used to hold the flexible reinforcing layer. In the case where two flexible reinforcing layers are used, the decorative layer may place between the flexible reinforcing layer and either of the upper mold and lower mold, preferably the upper mold. When a decorative layer is disposed between the flexible reinforcing layer and one the molds, it is preferred to use a flexible reinforcing layer which at least somewhat permeable to the expanding foam mass in the mold. The allows for the expanding foam mass to pass through the flexible reinforcing layer thereby providing a resilient polyurethane foam core which is adhered to both the flexible reinforcing layer and the decorative cover.

After expansion of the liquid foamable polyurethane composition, the polyurethane foam core produced therefrom preferably has a specific gravity of less than about 0.40, more preferably in the range of from about 0.10 to about 0.25. Preferably, the liquid foamable polyurethane composition has a free rise density of from about one to about twenty pounds per cubic foot, more preferably from about two to about eight pounds per cubic foot. In a preferred aspect of the present process the polymethane foam core has an indentation force deflection at 25% deflection in the range of from about 150 to about 4,000 pounds, more preferably from about 500 to about 2500 pounds, most preferably from about 900 to about 2000 pounds, when measured pursuant to ASTM 3574-B1.

Upon compression of the energy absorbing panel produced according the present process at the energy absorbing surface to about 50%, preferably to about 65%, more preferably to about 80%, by volume of the uncompressed panel in a direction substantially normal to the flexible reinforcing layer, the panel recovers to at least 90%, preferably at least 95%, by volume of the uncompressed panel in less than about 30 minutes. Preferably, the panel recovers to at least about 90% by volume of the uncompressed panel in less than about 10 minutes, more preferably less than about two minutes.

A particularly preferred embodiment of the present process comprises the use of two flexible reinforcing layers. Ideally, in this embodiment of the present process, one flexible reinforcing layer will be placed in each of the upper mold and the lower mold. Thereafter, the liquid foamable polyurethane composition may be conveniently dispensed, via an "open pour" or a "closed pour" technique, directly on to the flexible reinforcing layer previously placed in the lower mold. After the liquid foamable polyurethane composition is expanded to provide the resilient polyurethane foam core adhered to each of the flexible reinforcing layer, an energy absorbing panel results having two energy absorbing surfaces (i.e. at each flexible reinforcing layer) disposed in a spaced, substantially parallel relationship with respect to one another. The energy absorbing ability of such a panel is dramatically increased when compared to an energy absorbing panel comprising a single energy absorbing surface (i.e. a single flexible reinforcing layer).

The choice of liquid foamable polyurethane composition suitable for use in the present process is not particularly restricted. Non-limiting and preferred examples of suitable polyurethane foams for use in the present panel are available from Woodbridge Foam Corporation under the tradenames Enerflex 900, Enerflex II and Enerflex 400.

Generally, the polyurethane foam suitable for use in the present panel and having the requisite characteristics may be produced from the following general non-limiting formulation:

| Component | Amount |
| --- | --- |
| Polymer Polyol | 100–0 parts |
| Polyol | 0–100 parts |
| Crosslinker | 0–30 parts/100 parts total polyol |
| Catalyst | 0.05 to 3.5 parts/100 parts total polyol |
| Silicone Surfactants | 0–1.5 parts/100 parts total polyol |
| $H_2O$ | 0.5 to 3.5 parts/100 parts total polyol |
| Isocyanate | Adequate quantity for an index of from about .60 to 1.30 ratio of NCO equivalents to the equivalents of NCO reactive sights. |

Suitable polymer polyols, polyols and isocyanates are described in U.S. Pat. Nos. 3,304,273, 3,383,351, 3,523,093, 3,939,106 and 4,134,610 Belgian patent 788,115, Canadian Patent 785,835 and "Polymer/-Polyols, a New Class of Polyurethane Intermediate", Kuryla, W. C. et al., J. Cellular Plastics, March (1966), the contents of which are hereby incorporated by reference.

Suitable crosslinkers, catalysts and silicone surfactants are described in U.S. Pat. Nos. 4,107,106 and 4,190,712, the contents of which are hereby incorporated herein by reference.

The preferred polyurethane foam suitable for use in the present panel may be produced from the following formulation:

| Component | Amount |
| --- | --- |
| Polymer Polyol[1] | 30–70 parts |
| Polyol[2] | 70–30 parts |
| Crosslinker[3] | 5–15 parts/100 parts total polyol |
| Catalyst[4] | 0.5–1.2 parts/100 parts total polyol |
| Silicone Surfactants[5] | 0.3–1.1 parts/100 parts total polyol |
| $H_2O$ | 1.75–2.75 parts/100 parts total polyol |
| Isocyanate[6] | Adequate quantity for an index of from about 0.8 to 1.1 ratio of NCO equivalents to the equivalents of NCO reactive sights. |

[1] AC West Virginia Polyol Co. NIAX 31-28
[2] 5000 MW propylene oxide adduct of glycerine with 75% primary capping
[3] BASF 953
[4] DABCO R-8020
[5] Goldschmidt B-4113
[6] Dow Chemical Company PAPI 901

It should be noted that the flexible reinforcing layer used in the energy absorbing surface is used on or just beneath (due to impregnation by the expanding foam) the surface of the panel only. In other words, the components of the reinforcing layer are not used as fillers throughout the polyurethane foam core. Using this reinforcement technique on this particular type of resilient polyurethane foam provides surprising and unexpected stiffness and energy absorbing capabilities for the panel.

The present process is advantageous over the prior art in that it permits relatively efficient production of a useful energy absorbing panel. Specifically, use of the present process obviates waste of foam materials, the use of adhesives and the use of specialized molds. Further the present process, in one of its preferred aspects, allows for a single-step production of an energy absorbing mold. By "single-step", it is meant that all constituents of the panel may be placed in a single mold to produce the finished article.

The energy absorbing panel produced according to the present process is useful in a variety of applications. The energy absorbing panel has particular vehicular applications such as in door panels, instrument panel topper pads, air bag doors and the like.

Further, the energy absorbing panel produced according to the present process can be used in heel blocker pads. As will be appreciated by those skilled in the art, heel blocker pads are located under the carpet and dash insulator in a vehicle against the sheet metal of the dash. These devices serve to protect the bones of the drivers leg from excess loading under the heel of the drivers foot during a front end crash.

The energy absorbing panel produced according to the present process may also be used in knee bolsters used in vehicles. Typically, knee bolsters are used as blockers to prevent the knees of the driver and passenger in the front seat of a vehicle from sliding forward and underneath the instrument panel structure during an impact.

The energy absorbing panel produced according to the present process may be used as an anti-submarining device in vehicle seats. Generally such devices are incorporated underneath the seat cushion and serve the purpose of preventing the occupant from sliding forward and under the seat restraint during impact.

I claim:

1. A process for producing a resilient energy absorbing panel having an energy absorbing surface in a mold comprising an upper mold and a lower mold, said upper and lower molds being closeable to define an enclosure corresponding to the shape of the energy absorbing panel, said enclosure having a volume, the process comprising the steps of:

(i) placing a flexible, fibrous reinforcing layer in the upper mold and the lower mold;

(ii) dispensing a liquid foamable polyurethane composition in the lower mold;

(iii) expanding the foamable liquid polyurethane composition to fill about 50 to 90% by volume of said volume of said enclosure; and (iv) closing the upper mold and the lower mold to define said enclosure to produce a resilient energy absorbing panel having a resilient polyurethane foam core which adheres to and impregnates the reinforcing layer thereby providing an energy absorbing surface on the panel;

wherein the reinforcing layer has a tensile strength greater than the tensile strength of the resilient polyurethane foam core and upon compression of the panel at the energy absorbing surface to about 50% by volume of the uncompressed panel in a direction substantially normal to the reinforcing layer, the panel recovers to at least about 90% by volume of the uncompressed panel in less than about 30 minutes.

2. The process defined in claim 1, wherein said fibrous reinforcing layer comprises at least one member selected from the group consisting of glass fibres, polyester fibres, polyolefin fibres, aramid fibres, polyamide fibres, cellulose fibres and carbon fibres.

3. The process defined in claim 1, wherein Step (i) further comprises placing a decorative layer between the reinforcing layer and at least one of the upper mold and the lower mold.

4. The process defined in claim 1, wherein the same reinforcing layer is placed in each of the upper mold and the lower mold.

5. The process defined in claim 1, wherein said polyurethane foam core has a free rise density of from about 1 to about 20 pounds per cubic foot.

6. The process defined in claim 1, wherein said panel recovers to at least about 90% by volume of the uncompressed panel in less than about 10 minutes.

7. The process defined in claim 1, wherein said panel recovers to at least about 90% by volume of the uncompressed panel in less than about 2 minutes.

* * * * *